Figure 1:
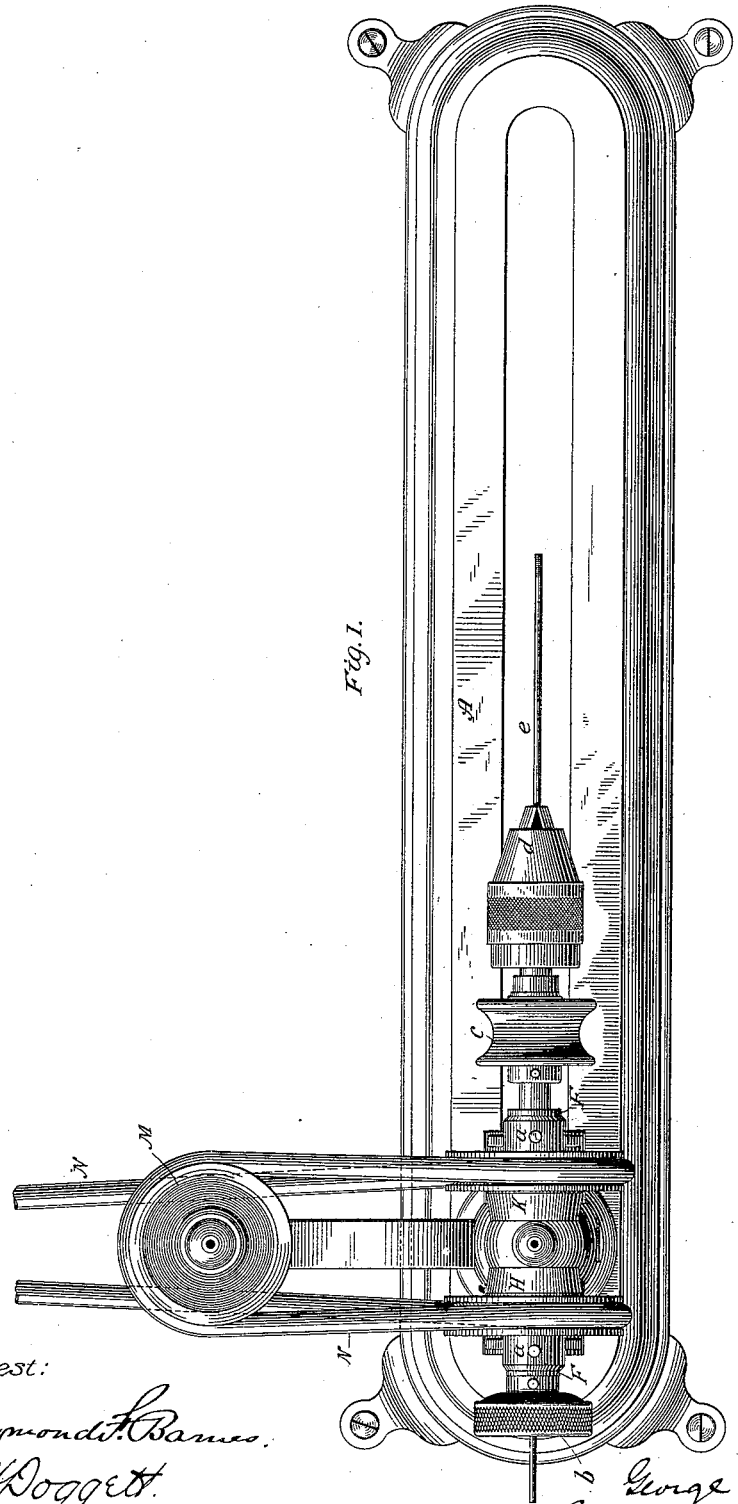

(No Model.) 2 Sheets—Sheet 1.

G. A. TOBEY.
REVERSING PULLEY.

No. 297,473. Patented Apr. 22, 1884.

Attest:
Raymond F. Barnes.
W. H. Doggett.

Inventor:
George A. Tobey.
By Parker W. Page
attys.

(No Model.) 2 Sheets—Sheet 2.
G. A. TOBEY.
REVERSING PULLEY.
No. 297,473. Patented Apr. 22, 1884.
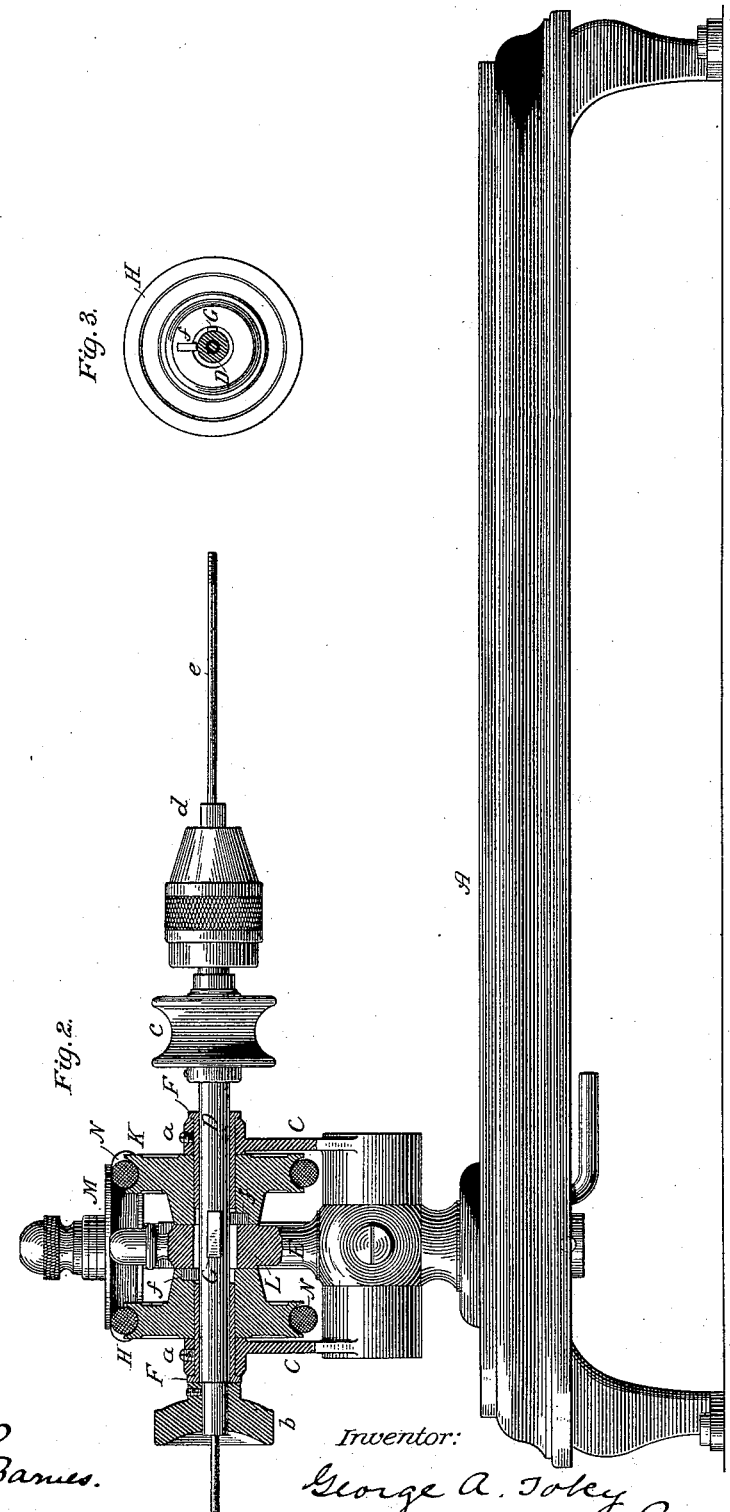

UNITED STATES PATENT OFFICE.

GEORGE A. TOBEY, OF NEWARK, NEW JERSEY, ASSIGNOR TO THE UNITED STATES ELECTRIC LIGHTING COMPANY, OF NEW YORK, N. Y.

REVERSING-PULLEY.

SPECIFICATION forming part of Letters Patent No. 297,473, dated April 22, 1884.

Application filed October 4, 1883. (No model.)

*To all whom it may concern:*

Be it known that I, GEORGE A. TOBEY, a citizen of the United States, and a resident of Newark, in the county of Essex and State of New Jersey, have invented certain new and useful Improvements in Reversing-Pulleys, of which the following is a specification, reference being had to the drawings accompanying and forming a part of the same.

The object of my invention is to produce a simple and easily-manipulated device for transmitting, by means of a cord or belt, motion from a driving to a driven shaft or spindle, and for reversing the direction of the motion of the latter without shifting or varying the action of the belt. The construction of the devices by means of which I accomplish this object is as follows: A spindle or shaft is mounted in bearings around which turn pulley-wheels. Between these pulleys is set a guide-pulley, and a cord or belt from a driving-pulley runs around the guide-pulley and the two others, so that the latter have movements in reverse directions. On the spindle or shaft is a clutch of any proper kind, that is caused to engage with one of the reversing-pulleys by moving the shaft forward or back in its bearings. The direction of rotation of the shaft may thus be reversed by sliding it in opposite directions and causing it to engage with one or the other of the pulleys. This apparatus I have found more especially applicable to boring or drilling purposes, such as required in the manufacture of screw-bolts, nuts, and the like. In the accompanying drawings I have illustrated the invention as embodied in a machine of this character.

Figure 1 is a plan view of the apparatus. Fig. 2 is an elevation of the same with the reversing-pulleys in section. Fig. 3 is a face view of one of the said pulleys.

A is the base or bench; B, a stand having the arms or standards C C E, in which are the journal-bearings.

F F are steel sleeves or tubes fixed in the arms C C by set-screws *a*. D is a hollow spindle journaled in the same, and capable of an endwise movement.

On the spindle D is a detachable head, *b*, a grooved wheel, or equivalent, *c*, and a chuck, *d*. Through the spindle the wire or rod *e* that is to be made up into screws or screw-bolts is passed and held by the chuck *d*.

G is a lug on the spindle between the two reversing-pulleys H K, that are mounted loosely on the steel sleeves F. The inner faces of these pulleys abut against a plate, L, through which the spindle D passes for this purpose, being made to project beyond the sleeves F.

In the pulleys H K, which are preferably of brass, are set steel pins or teeth *f f*.

M is a grooved guide-pulley journaled on the standard E between the pulleys H K, and at a short distance from them.

N is a cord or belt running around a suitable driving-pulley, (not shown in the drawings,) the two pulleys H K, and the guide-pulley M. The pulleys H K will evidently be driven in opposite directions.

In using the apparatus, the spindle is shifted in its bearings to bring the lug G within one of the pulleys H K, so that it engages with the pin *f*. Motion is thus imparted to the spindle, and a screw-thread may be formed on the rod *e* by applying a screw-tap to its end. When the desired length of thread is formed, the spindle is shifted over into engagement with the other pulley and the tap removed.

The grooved wheel *c* forms a convenient means for shifting the spindle by the fingers, though any other device may be used for this purpose.

Though described as applied to a special device, my invention may obviously be used under other conditions and for any other and similar purposes where a reversing shaft or spindle is needed.

I am aware that the combination with a driving-pulley of two reversely-driven pulleys and a guide pulley is not new; but

What I claim is—

1. The combination, with two loose reversing-pulleys, an intermediate guide-pulley, and a belt, of a shaft or spindle capable of endwise movement, and means for bringing the same into engagement with either loose pulley, substantially as set forth.

2. The combination, with pulleys H K, having the lugs $f\,f$, guide-pulley M, and belt N, of the spindle D, provided with the lug G, and means for imparting to the shaft an endwise movement, whereby the same is caused to engage with either of the pulleys H K, as set forth.

In testimony whereof I have hereunto set my hand this 20th day of September, 1883.

GEORGE A. TOBEY.

Witnesses:
 HENRY A. BECKMEYER,
 HENRY S. LOWE.